3,311,615
CERTAIN BENZOTHIAZOCINE DERIVATIVES
Richard J. Mohrbacher, Fort Washington, Pa., assignor to McNeil Laboratories, Incorporated, a corporation of Pennsylvania
No Drawing. Filed June 8, 1965, Ser. No. 462,402
19 Claims. (Cl. 260—239.3)

This invention relates to certain novel benzothiazocine derivatives. More particularly, this invention is concerned with 3,4 - dihydro-2H-1,6-benzothiazocin-5(6H)-ones having the formula

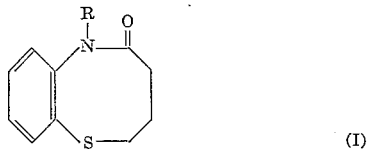

and the 3,4,5,6-tetrahydro-2H-1,6-benzothiazocines having the formula

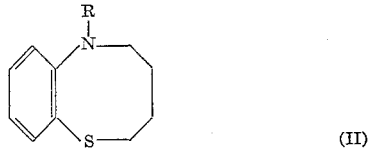

wherein R is a member selected from the group consisting of hydrogen, loweralkyl, phenylloweralkyl and diloweralkylaminoloweralkyl; and the non-toxic, therapeutically active acid addition salts and loweralkyl quaternary ammonium derivatives of the basic nitrogen containing compounds.

As used herein loweralkyl may be straight or branch chained and have from 1 to 6 carbon atoms, such as, for example, methyl, ethyl, propyl, isopropyl, butyl, isobutyl, tertiary butyl and the like, except in the case of loweralkyl to which is attached di-loweralkylamino, in which instance that loweralkyl may be straight or branch chained and have from 2 to 6 carbon atoms.

Those compounds of this invention containing a basic nitrogen may be converted to their therapeutically useful acid addition salts by reaction with an appropriate acid as, for example, an inorganic acid, i.e., hydrochloric, hydrobromic or hydriodic acid; sulfuric or nitric acid; a phosphoric acid; an organic acid such as acetic, propionic, glycolic, lactic, pyruvic, oxalic, malonic, succinic, maleic, fumaric, malic, tartartic, citric, benzoic, cinnamic, mandelic, methanesulfonic, ethanesulfonic, hydroxyethanesulfonic, benzenesulfonic, p-toluenesulfonic, salicyclic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, e.g., by reaction with an alkali such as sodium or potassium hydroxide.

The novel basic nitrogen containing compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzene are the preferred solvents.

The benzothiazocin-5(6H)-one of this invention wherein R is hydrogen is prepared by subjecting 3,4-dihydro-1-benzothiepin-5(2H)-one to the conditions of the Schmidt reaction wherein 3,4-dihydro-1-benzothiepin - 5(2H)-one is reacted with hydrazoic acid in the presence of an acid catalyst and a suitable solvent such as chloroform or benzene. The benzothiazocin-5(6H)-ones of this invention wherein R is loweralkyl, phenylloweralkyl or dialkylaminoalkyl are prepared by reacting 3,4-dihydro-2H-1,6-benzothiazocin-5(6H)-one with sodium hydride in a solvent such as monoglyme and reacting the resultant product with a loweralkyl halide, a phenylloweralkyl halide or a dialkylaminoalkyl halide.

In place of sodium hydride in the above procedure, other strong bases such as an alkali metal hydroxide amide or alkoxide such as potassium hydroxide, sodamide or potassium tertiary butoxide in a suitable organic solvent such as ether or hydrocarbons, for example, diethylether, benzene or tetrahydrofuran for the alkali metal hydrides and amides, or lower alkanols such as ethanol or tertiary butanol for the alkali metal hydroxides may be used.

The tetrahydro-benzothiazocine of this invention where R is hydrogen or dialkylaminoalkyl is prepared by reacting 3,4-dihydro-2H-1,6-benzothiazocin - 5(6H)-one with lithium aluminum hydride in a solvent such as dry tetrahydrofuran. The tetrahydrobenzothiazocines of this invention wherein R is loweralkyl, phenylloweralkyl or dialkylaminoalkyl are prepared by reacting a 3,4-dihydro-6-R-2H-1,6-benzothiazocin-5(6H)-one with lithium aluminum hydride in tetrahydrofuran.

In place of lithium aluminum hydride as a reducing agent in the foregoing procedure, reducing agents such as the boron hydrides, for example diborane or alkyl boranes; or alkali metal borohydrides combined with a Lewis acid, for example sodium borohydride—aluminum chloride or potassium borohydride—boron trifluoride may be used. The solvent may be a suitable inert organic solvent such as tetrahydrofuran, diethyl ether, or ethylene glycol dimethyl ether.

The compounds of this invention, including those of Formula I and Formula II, have valuable pharmacological properties in view of their hypotensive activity.

The following examples are intended to illustrate but not to limit the scope of the present invention.

*Example I*

A chloroform solution of hydrazoic acid is prepared by treating a cooled, stirred mixture of 13 g. (0.2 mole) of sodium azide, 13 ml. of water and 80 ml. of chloroform with 19.6 g. (0.2 mole) of concentrated sulfuric acid. The chloroform layer is decanted and dried for 3 hours in the cold over magnesium sulfate. To the dried hydrazoic acid solution is added 17.8 g. (0.1 mole) of 3,4-dihydro-1-benzothiepin-5(2H)-one. The stirred solution is cooled and kept between 10–40° C. during the one hour addition of 28 ml. of concentrated surfuric acid. The reaction is stirred for 30 minutes at 45° C. and then poured into a solution of 74 ml. of concentrated ammonium hydroxide in 300 ml. of ice water. The organic layer is removed, washed with dilute ammonium hydroxide and brine and dried over calcium chloride. The organic solution is concentrated in vacuo to give a semisolid gum which crystallizes. Three recrystallizations from 2-propanol gives analytically pure 3,4-dihydro-2H-1,6-benzothiazocin-5(6H)-one, M.P. 177–179° C.

*Example II*

To a stirred slurry of 1.2 g. (0.05 mole) of sodium hydride in 75 ml. of dry monoglyme is added a solution of 7.75 g. (0.04 mole) of 3,4-dihydro-2H-1,6-benzothiazocin-5(6H)-one in 150 ml. of monoglyme. Heating is necessary to obtain complete conversion to the sodium salt. After cooling to room temperature, 6.1 g. (0.05 mole) of 3-dimethylaminopropyl chloride is added in 25 ml. of monoglyme and the slurry is heated at reflux temperature for 18 hours. The slurry is poured into dilute aqueous hydrochloric acid and filtered to remove the sodium chloride. The filtrate is concentrated in vacuo to remove the monoglyme, extracted with benzene, made basic, and extracted with methylene chloride. The organic layers are combined, washed with brine, dried and concentrated in vacuo to give an oil. The oil is distilled (175° C./0.65 mm.) to give an oil which is converted to the fumarate salt in ethyl alcohol-ether. The salt is recrystallized twice from alcohol-ether to give white crystalline 6-(3-dimethylaminopropyl)-3,4-dihydro - 2H - 1,6-benzothiazocin-5(6H)-one fumarate, M.P. 134–136° C.

*Example III*

To a stirred slurry of 5.8 g. (0.153 mole) of lithium aluminum hydride in 150 ml. of freshly distilled tetrahydrofuran is slowly added a solution of 7.5 g. (0.039 mole) of 3,4-dihydro-2H-1,6-benzothiazocin-5(6H)-one in 200 ml. of tetrahydrofuran. The slurry is heated at reflux temperature for 18 hours, cooled, decomposed with water and filtered. The filtrate is concentrated in vacuo to an oil which is poured into a solution of maleic acid in 2-propanol to give the maleate salt. After two recrystallizations from alcohol pure crystals of 3,4,5,6-tetrahydro-2H-1,6-benzothiazocine maleate are obtained, M.P. 139–141° C.

*Example IV*

A solution of 6.5 g. (0.023 mole) of 3,4-dihydro-6-(3-dimethylaminopropyl)-2H-1,6-benzothiazocin - 5(6H)-one in 100 ml. of dried tetrahydrofuran is added dropwise to a stirred slurry of 3.55 g. (0.093 mole) of lithium aluminum hydride in 400 ml. of tetrahydrofuran. The slurry is heated at reflux temperature for 18 hours, cooled, decomposed with 24 ml. of water and filtered. The filtrate is concentrated in vacuo to a golden oil. The oil is taken into dilute hydrochloric acid and the solution is extracted with benzene. The aqueous layer is made basic with dilute sodium hydroxide and extracted with methylene chloride. The organic layer is washed with brine, dried and concentrated in dryness in vacuo to an oil. The oil is distilled at 126° C. at 0.75 mm. to give 6-(3-dimethylaminopropyl) - 3,4,5,6 - tetrahydro - 2H - 1,6 - benzothiazocine.

*Example V*

Using the procedure of Example II and replacing 3-dimethylaminopropyl chloride with equivalent amounts of 2-dimethylaminoethyl chloride,
2-diethylaminoethyl chloride,
3-dimethylaminobutyl chloride and 3-diethylaminopropyl chloride,
6-(dialkylaminoalkyl)-3,4-dihydro-2H-1,6-benzothiazocin-5(6H)-ones are produced, namely,
6-(2-dimethylaminoethyl)-3,4-dihydro-2H-1,6-benzothiazocin-5(6H)-one,
6-(2-diethylaminoethyl)-3,4-dihydro-2H-1,6-benzothiazocin-5(6H)-one,
6-(3-dimethylaminobutyl)-3,4-dihydro-2H-1,6-benzothiazocin-5(6H)-one and
6-(3-diethylaminopropyl)-3,4-dihydro-2H-1,6-benzothiazocin-5(6H)-one.

*Example VI*

Using the procedure of Example III and replacing 3,4-dihydro-2H-1,6-benzothiazocin-5(6H)-one with equivalent amounts of each of the products of Example V, the corresponding 6 - (dialkylaminoalkyl)-3,4,5,6-tetrahydro-2H-1,6-benzothiazocines are produced, namely, 6-(2-dimethylaminoethyl)-3,4,5,6-tetrahydro-2H-1,6-benzothiazocin-5(6H)-one,
6-(2-diethylaminoethyl)-3,4,5,6-tetrahydro-2H-1,6-benzothiazocine,
6-(3-dimethylaminobutyl)-3,4,5,6-tetrahydro-2H-1,6-benzothiazocine and
6-(3-diethylaminopropyl)-3,4,5,6-tetrahydro-2H-1,6-benzothiazocine.

*Example VII*

Using the procedure of Example II and replacing 3-dimethylaminopropyl chloride with equivalent amounts of ethyl bromide, benzyl chloride and phenethylchloride, the resulting products are 6-(2-ethyl)-3,4-dihydro-2H-1,6-benzothiazocin-5(6H)-one,
6-benzyl-3,4-dihydro-2H-1,6-benzothiazocin-5(6H)-one and
6-phenethyl-3,4-dihydro-2H-1,6-benzothiazocin-5(6H)-one.

*Example VIII*

Using the procedure of Example III and replacing 3,4-dihydro-2H-1,6-benzothiazocin-5(6H)-one with equivalent amounts of each of the products of Example VII, the resulting products are 6-(2-ethyl)-3,4,5,6-tetrahydro-2H-1,6-benzothiazocine,
6-benzyl-3,4,5,6-tetrahydro-2H-1,6-benzothiazocine and
6-phenethyl-3,4,5,6-tetrahydro-2H-1,6-benzothiazocine.

What is claimed is:
1. A member selected from the group of 3,4-dihydro-2H-1,6-benzothiazocin-5(6H)-ones having the formula

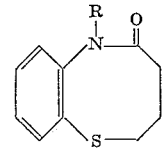

wherein R is a member selected from the group consisting of hydrogen, loweralkyl, phenylloweralkyl and diloweralkylaminoloweralkyl; and the non-toxic, therapeutically active acid addition salts and loweralkyl quaternary ammonium derivatives of the basic nitrogen containing compounds.

2. A member selected from the group of 3,4,5,6-tetrahydro-2H-1,6-benzothiazocines having the formula

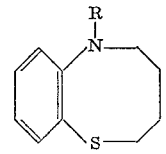

wherein R is a member selected from the group consisting of hydrogen, loweralkyl, phenylloweralkyl and diloweralkylaminoloweralkyl; and non-toxic, therapeutically active acid addition salts and loweralky quaternary ammonium derivatives of the basic nitrogen containing compounds.

3. 3,4-dihydro 2H-1,6-benzothiazocin-5(6H)-one.
4. 6 - (3 - dimethylaminopropyl) - 3,4 - dihydro - 2H-1,6-benzothiazocin-5(6H)-one.
5. 6 - (2 - dimethylaminoethyl) - 3,4 - dihydro - 2H-1,6-benzothiazocin-5(6H)-one.
6. 6 - (2 - diethylaminoethyl) - 3,4 - dihydro - 2H-1,6-benzothiazocin-5(6H)-one.

7. 6 - (3 - dimethylaminobutyl) - 3,4 - dihydro - 2H-1,6-benzothiazocin-5(6H)-one.

8. 6 - (3 - diethylaminopropyl) - 3,4 - dihydro - 2H-1,6-benzothiazocin-5(6H)-one.

9. 3,4,5,6 - tetrahydro - 2H - 1,6 - benzothiazocine.

10. 6 - (3 - dimethylaminopropyl) - 3,4,5,6 - tetrahydro-2H-1,6-benzothiazocine.

11. 6 - (2 - dimethylaminoethyl) - 3,4,5,6 - tetrahydro-2H-1,6-benzothiazocine.

12. 6 - (2 - diethylaminoethyl) - 3,4,5,6 - tetrahydro-2H-1,6-benzothiazocine.

13. 6 - (3 - diethylaminopropyl) - 3,4,5,6 - tetrahydro-2H-1,6-benzothiazocine.

14. 6 - (2 - ethyl) - 3,4,5,6 - tetrahydro - 2H - 1,6-benzothiazocine.

15. 6 - phenethyl - 3,4,5,6 - tetrahydro - 2H - 1,6-benzothiazocine.

16. 6 - (3 - dimethylaminobutyl) - 3,4 - dihydro - 2H-1,6-benzothiazocin-5(6H)-one.

17. 6 - (3 - dimethylaminopropyl) - 3,4 - dihydro-2H-1,6-benzothiazocin-5(6H)-one.

18. 6 - (2 - ethyl) - 3,4 - dihydro - 2H - 1,6 - benzothiazocin-5(6H)-one.

19. 6 - phenethyl - 3,4 - dihydro - 2H - 1,6 - benzothiazocin-5(6H)-one.

References Cited by the Examiner
UNITED STATES PATENTS
3,155,649  11/1964  Krapcho et al. _____ 260—239.3

WALTER A. MODANCE, *Primary Examiner.*

R. BOND, *Assistant Examiner.*